United States Patent [19]

Pedain et al.

[11] Patent Number: 5,081,203

[45] Date of Patent: Jan. 14, 1992

[54] MOISTURE-HARDENING COATING COMPOSITION AND METHOD FOR ITS PRODUCTION

[75] Inventors: Josef Pedain, Cologne; Jürgen Schwindt, Leverkusen, both of Fed. Rep. of Germany; Theodor Engbert, Sao Paulo, Brazil; Manfred Schönborn, Leverkusen, Fed. Rep. of Germany

[73] Assignee: Bayer Aktiengesellschaft, Leverkusen, Fed. Rep. of Germany

[21] Appl. No.: 543,641

[22] Filed: Jun. 26, 1990

[30] Foreign Application Priority Data

Jul. 1, 1989 [DE] Fed. Rep. of Germany ....... 3921699

[51] Int. Cl.⁵ .................. C08G 18/16; C08G 18/28
[52] U.S. Cl. .......................... 528/49; 528/53; 528/73; 528/44; 523/203
[58] Field of Search ............ 528/49, 53, 73, 44; 523/203

[56] References Cited

U.S. PATENT DOCUMENTS

| | | | |
|---|---|---|---|
| 3,479,325 | 11/1969 | Blomeyer et al. | 528/48 |
| 4,053,537 | 10/1977 | Ruprecht et al. | 528/53 |
| 4,442,279 | 4/1984 | Fauss et al. | 528/44 |
| 4,737,566 | 4/1988 | Pedain et al. | 528/78 |

FOREIGN PATENT DOCUMENTS 1488647 10/1977 United Kingdom .

*Primary Examiner*—John Kight, III
*Assistant Examiner*—John M. Cooney, Jr.
*Attorney, Agent, or Firm*—Joseph C. Gil; Thomas W. Roy

[57] ABSTRACT

The present invention relates to of a coating composition containing a moisture-hardening binder based on organic polyisocyanates which is prepared by forming a mixture containing at least those auxiliaries and additives which are not completely dry and an isocyanate component a) which has an average NCO functionality of 1.05 to 1.8 and is based on the reaction product of a1) a polyisocyanate mixture of the diphenylmethane series with a2) a monohydric $C_{1-26}$ alkanol which may contain ether bridges, and after the isocyanate/water reaction is substantially complete, further mixing the mixture with an isocyanate component b) which has an isocyanate content of 2.5 to 25% by weight and any remaining auxiliaries and additives, the quantities of components a) and b) corresponding to a weight ratio of a) to b) of 1:1 to 1:30.

The present invention also relates to a process for the preparation of these coating compositions.

8 Claims, No Drawings

MOISTURE-HARDENING COATING COMPOSITION AND METHOD FOR ITS PRODUCTION

BACKGROUND OF THE INVENTION

1. Field of the Invention

This invention relates to a new moisture-hardening coating compositions containing organic polyisocyanates as binders and to a process for their preparation.

2. Description of the Prior Art

Moisture-hardening coating compositions containing organic polyisocyanates, particularly NCO prepolymers of relatively high molecular weight, as the binder are known (cf. for example H. Kittel, Lehrbuch der Lacke und Beschichtungen, 1973, Verlag W. A. Colomb, Vol. I, Part 2, pages 573–576).

The quality of the paint films obtained from such coating compositions and, in particular, the stability of the ready-to-use coating compositions in storage are critically determined by the dryness of the auxiliaries and additives, such as pigments, fillers and/or solvents. Accordingly, these additives have to be satisfactorily dried before production of the coating compositions. Highly reactive, organic isocyanates have been successfully used for this drying (DE-PS 1 245 590, DE-OS 2 539 728 and DE-OS 3 204 128).

However, the use of such highly reactive, low molecular weight isocyanate compounds, in particular tosyl isocyanate, is also attended by disadvantages including high vapor pressure; often extremely high reactivity, which necessitates particular precautionary measures; and, especially, the fact that the isocyanates react with water to form insoluble secondary products, such as ureas, which crystallize out of the paint mixture, cause clouding and can thus lead to film defects and poor levelling.

Accordingly, an object of the present invention is to provide new coating compositions based on isocyanate compounds which do not involve the use of highly reactive isocyanates as drying agents, but which nevertheless show excellent stability in storage in the absence of moisture and lead to high-quality paint films.

This object was achieved in accordance with the present invention as described in detail hereinafter.

SUMMARY OF THE INVENTION

The present invention relates to a coating composition containing a moisture-hardening binder based on organic polyisocyanates and auxiliaries and additives, e.g., fillers pigments, solvents, catalysts and flow aids which is prepared by forming a mixture containing at least those auxiliaries and additives which are not completely dry and an isocyanate component a) which has an average NCO functionality of 1.05 to 1.8 and is based on the reaction product of a1) a polyisocyanate mixture containing, based on the weight of the mixture, 20 to 70% by weight of 2,4'-diisocyanatodiphenylmethane, 20 to 70% by weight of 4,4'- and/or 2,2'-diisocyanatodiphenylmethane and 5 to 30% by weight of higher functional polyisocyanates of the diphenylmethane series having an NCO functionality of >2 with a2) a monohydric $C_{1-26}$ alkanol which may contain ether bridges in an amount sufficient to provide to provide a reaction product having an NCO functionality of 1.05 to 1.8, and after the isocyanate/water reaction is substantially complete, further mixing the mixture with an isocyanate component b) which has an isocyanate content of 2.5 to 25% by weight and is based on the reaction product of b1) a polyisocyanate component based on at least one aromatic polyisocyanate having an NCO content of 10 to 50% by weight with b2) an amount sufficient to provide a reaction product having an isocyanate content of 2.5 to 25% by weight of a polyhydroxyl component based on at least one polyol having a molecular weight of 500 to about 10,000 and a hydroxyl functionality of 2 to 6 and containing ether, ester, thioether and/or carbonate groups, wherein the polyol may be admixed with up to 40% by weight, based on the total weight of component b2), of at least one alcohol having a molecular weight in the range from 62 to 499 and a hydroxyl functionality of 2 to 6, and any remaining auxiliaries and additives, the quantities of components a) and b) corresponding to a weight ratio of a) to b) of 1:1 to 1:30.

The present invention is also directed to a process for the preparation of these coating compositions.

DETAILED DESCRIPTION OF THE INVENTION

The end products of the process according to the invention represent a considerable improvement, even over the systems according to DE-OS 28 45 514. According to the teaching of this prior publication, which is concerned with mixtures of mono- and polyisocyanates, water-containing auxiliaries and additives must be dried with suitable drying agents, such as tosyl isocyanate, as can be seen for example from Example 3. This reference does not disclose how such drying agents could be eliminated.

Component a) is based on a reaction product of components a1) and a2). Component a1) is a polyisocyanate mixture of the diphenylmethane series having the above-mentioned composition. Component a1) is preferably a mixture of 20 to 70% by weight, more preferably 30 to 50% by weight of 2,4'-diisocyanatodiphenylmethane; 20 to 70% by weight, more preferably 40 to 60% by weight of 4,4'-diisocyanatodiphenylmethane; 0 to 10% by weight, more preferably 0 to 5% by weight of 2,2'-diisocyanatodiphenylmethane; and 5 to 30% by weight, more preferably 5 to 15% by weight of higher polyisocyanates of the diphenylmethane series. Component a1) has an average NCO functionality of >2 to 2.3, preferably 2.05 to 2.25. These polyisocyanate mixtures are produced in known manner by the phosgenation of aniline/formaldehyde condensates; the comparatively high content of 2,4'-diisocyanatodiphenylmethane is obtained either by suitable control of the aniline/formaldehyde condensation or by distilling off a diisocyanate fraction having a high content of 2,4'-diisocyanatodiphenylmethane and remixing this fraction with other polyisocyanate mixtures of the diphenylmethane series.

Component a2) is based on a monohydric, optionally olefinically unsaturated $C_{1-26}$, preferably $C_{4-14}$ and more preferably $C_{6-12}$ (cyclo)alkanol which may contain ether bridges. Suitable (cyclo)alkanols include i-propanol, allyl alcohol, i-butanol, n-dodecanol, n-octadecanol, ethoxyethanol, propoxyethanol, methoxypropanol, butoxyethanol and cyclohexanol; and, preferably, branched alcohols such as neopentyl alcohol, 2-ethylhexanol and the isomeric trimethylhexanols.

To prepare component a) starting components a1) and a2) are reacted with one another using an NCO excess. Component a2) is used in an amount such that the resulting reaction product a) has an average NCO functionality of 1.05 to 1.8, preferably 1.2 to 1.6 and more preferably 1.3 to 1.5. The starting components a1) and a2) are reacted in known manner at about 20° to 100° C., preferably at 30° to 80° C., for example, by initially introducing the isocyanate component a1) into a suitable reaction vessel and stirring the alcohol component a2) into the isocyanate component.

Component b) is based on the reaction product of starting components b1) and b2). Component b1) is an aromatic polyisocyanate having an NCO content of 10 to 50% by weight, preferably 25 to 48% by weight. The known diisocyanates of polyurethane chemistry are preferably used as component b1). Examples of suitable starting polyisocyanates b1) include 2,4-and/or 2,6-diisocyanatotoluene, 2,4'- and/or 4,4'-diisocyanatodiphenylmethane and mixtures of these diisocyanates. Polyisocyanate mixtures of the diphenylmethane series are also suitable such as those suitable for use as component a1) and also those having a lower content of 2,4'-diisocyanatodiphenylmethane and a higher content of 4,4'-diisocyanatodiphenylmethane.

The polyhydroxyl component b2) is based on a polyhydroxyl compound containing ether, ester, thioether and/or carbonate groups and having an average molecular weight ($M_n$, which may calculated from the functionality and the hydroxyl group content) of 500 to about 10,000, preferably about 1,000 to 4,000, and a hydroxyl functionality of 2 to 6, preferably 2 to 4. Also suitable as polyhydroxyl component b2) are mixtures of the previously described relatively high molecular weight polyhydroxyl compounds with low molecular weight polyhydric alcohols having a molecular weight of 62 to 499, preferably 62 to 200 and a hydroxyl functionality of 2 to 6, preferably 2 to 4. The low molecular weight alcohols may be used in a quantity of up to 40% by weight, based on the total weight of component b2).

Component b2) is preferably based on polyether polyols having molecular weights and hydroxyl functionalities in the ranges mentioned above or mixtures of such polyether polyols with low molecular weight polyhydric alcohols of the type mentioned.

The relatively high molecular weight polyhydroxyl compounds may be prepared in known manner. The preferred polyether polyols may be obtained by the alkoxylation of suitable starter molecules, e.g., the polyhydric alcohols described in detail hereinafter; amines containing at least 2 NH bonds such as ethylene diamine, hexamethylene diamine and aniline; and also aminoalcohols such as ethanolamine, diethanolamine, propanolamine and dipropanolamine. Mixtures of various starter molecules may also be used. Propylene oxide and/or ethylene oxide, either in admixture or sequentially, are preferably used for the alkoxylation.

The low molecular weight alcohols which are suitable as starter molecules include, in particular, monomeric alkane polyols such as ethylene glycol, propylene glycol, trimethylol propane, glycerol, pentaerythritol, sorbitol and mixtures thereof.

Component b) may be produced in various ways. For example, a polyisocyanate suitable for use as component b1) such as 2,4-diisocyanatotoluene may be reacted with a relatively high molecular weight alcohol suitable for use as component b2) or with a mixture of such a relatively high molecular weight alcohol and at least one low molecular weight polyol while maintaining a large NCO excess during the reaction; subsequently the unreacted excess isocyanate is preferably removed by distillation. Component b) may also be produced by reacting a first part of a starting polyisocyanate b1) with a relatively high molecular weight polyol, reacting a second part of a starting polyisocyanate b1) with a low molecular weight polyhydric alcohol and subsequently mixing the reaction products with one another. Different starting polyisocyanates b1) and various mixtures of polyhydroxyl compounds may of course be used. The particular method used to produce component b) is not crucial to the invention, provided that component b) is essentially based on aromatic starting polyisocyanates b1) and relatively high molecular weight and, optionally, low molecular weight polyhydroxyl compounds b2).

Component b) preferably has an NCO content of 2.5 to 25% by weight, more preferably 3 to 20% by weight.

The coating compositions produced in accordance with the present invention contain auxiliaries and additives known from paint technology such as fillers, pigments, solvents, catalysts and flow control agents. In accordance with the present invention at least those auxiliaries and additives which are not completely dry are initially mixed with component a) which acts as a drying agent. Upon completion of drying, i.e. when there is no further evolution of carbon dioxide, the resulting mixture is mixed with the remaining components.

It is preferred to calculate the quantity of component a) which corresponds to a molar ratio of isocyanate groups of component a) to water of about 1.5:1 to 30:1, preferably about 2:1 to 15:1, based on the water content of all of the additives and auxiliaries, and to mix this calculated quantity of component a) with the water-containing auxiliaries and additives and, optionally, the dry auxiliaries and additives. The effect of using an excess of component a) over the water to be removed from the auxiliaries and additives is that free isocyanate groups remain in component a) to react with atmospheric moisture together in a manner similar to component b) which results in a uniform paint film without defects.

In many cases, component a) also acts as a thixotropic agent for the ready-to-use coating composition. Accordingly, component a) is simultaneously a drying agent and stabilizer, a rheological additive and a binder component. Dry auxiliaries and additives may be added together with the water-containing auxiliaries and additives at the beginning of the process or at the end of the process. To accelerate the water/NCO reaction during the drying step, it is advantageous to adjust the temperature of the mixture to 20° to 90° C., preferably 50° to 80° C., and to maintain that temperature until the evolution of carbon dioxide has stopped. The remaining components, particularly component b), which may be present as a solution in a predried solvent, and the dry auxiliaries and additives, if any, which were not added with the water-containing auxiliaries and additives, may then be added. In general, the ratio by weight of component a) to component b) in accordance with the invention is about 1:1 to 1:30, preferably about 1:2 to 1:10.

If desired, the mixtures prepared as described may be covered with a layer of additional (anhydrous) solvent and left standing for a few hours.

After careful remixing, a ready-to-use, moisture-hardening, one-component coating composition is obtained.

The solvents which may be present in the coating compositions include known paint solvents such as toluene, xylene, alkyl-substituted aromatics, ethyl acetate, butyl acetate, methoxypropyl acetate, methyl ethyl ketone, methyl isobutyl ketone and mixtures of such solvents. Other auxiliaries and additives include those generally used in one-component polyurethane paints such as metallic or mineral pigments, fillers and other auxiliaries of the type described, for example, in H. Kittel, Lehrbuch der Lacke und Beschichtungen, Vol. 3, Verlag W. A. Colomb, Berlin-Schwandorf (1976).

The coating compositions obtained by the process according to the invention may be applied by any of the methods o used in coating technology. They are suitable for the production of bubble-free coatings of high layer thickness on metallic substrates, concrete, masonry and other substrates. They may be used with particular advantage for corrosion-inhibiting primers and paints, for example, for bridges, containers, solvent containers, steel structures and high-voltage pylons; and for coatings in the maritime field, for example, for coating drilling platforms, port installations, locks, floating docks and ships.

The coating compositions according to the invention are distinguished from previously known one-component polyurethane coating compositions by their improved stability in storage while maintaining at least the same drying rate and at least equally good mechanical properties in the resulting paint films.

In the following examples, all percentages are by weight unless otherwise indicated.

EXAMPLES

The following starting components are used in the examples:

Isocyanate component I [component a)]

760 g of a polyisocyanate mixture of the diphenylmethane series containing 4.2% by weight 2,2'-, 36.8% by weight 2,4'- and 48.0% by weight 4,4'-diisocyanatodiphenylo-methane and 11% by weight of higher functional polyisocyanates were stirred for about 2 h at 60° C. with 240 g of 2-ethyl hexanol until the NCO content remained constant at approximately 15.9%. Before the reaction with the alcohol, the NCO functionality was approximately 2.07 and, after the reaction, the NCO functionality was approximately 1.4. A yellowish-brown liquid having a viscosity of 620 mPa.s/23° C. was obtained.

Isocyanate component II [component a)]

274 g of a polyisocyanate mixture of the diphenylmethane series consisting of 3.2% by weight 2,2'-, 41.0% by weight 2,4'- and 40.8% by weight 4,4'-diisocyanatodiphenyl-methane and 15% by weight of higher functional polyisocyanates of the diphenylmethane series were reacted with 121 g of lauryl alcohol with thorough stirring at a temperature of 60° C. The incorporation of the monoalcohol reduced the NCO functionality from an original value of approximately 2.15 to approximately 1.5. The NCO content was 16%. The yellowish-brown product had a viscosity of 580 mPa.s/25° C.

Isocyanate component III [component b)]

A 60% solution in a mixture of equal parts of xylene and methoxypropyl acetate of a urethane polyisocyanate based on the reaction product of 2,4-diisocyanatotoluene with a mixture of trimethylol propane and a tetrafunctional polyether polyol having a molecular weight 4,000 and prepared by the propoxylation of ethylene diamine. The ratio by weight of trimethylol propane to polyether polyol was 1:3. The solution had an NCO content of 6.7%.

Isocyanate component IV [component b)]

A solvent-free urethane polyisocyanate based on the reaction product of 2,4-diisocyanatotoluene with a polyether polyol having a molecular weight 3,000 and prepared by the propoxylation of glycerol. The isocyanate-terminated prepolymer had an NCO content of 3.2% and a viscosity at 23° C. of 8,000 mPa.s.

Isocyanate component V [component b)]

A solvent-free urethane polyisocyanate based on the reaction product of (i) crude MDI containing approximately 24% of 2,2'- and 2,4'-diisocyanatodiphenylmethane, approximately 25% of 4,4'-diisocyanatodiphenylmethane and 51% of higher functional polyisocyanates of the diphenylmethane series and (ii) a polyether mixture based on equal parts by weight of a tetrafunctional polyether polyol having a molecular weight of 4,000 and prepared by propoxylation of ethylene diamine and a polypropylene glycol having a molecular weight.2,000. The ratio by weight of component (i) to component (ii) was approximately 60:40. The NCO content of the urethane polyisocyanate (NCO prepolymer) was 16% by weight and its viscosity at 23° C. was 800 mPa.s.

General procedure for the process according to the invention

The solvent, flow control agent, rheology aid and isocyanate component a) were mixed in a dispersion vessel. The quantity of isocyanate component a) was calculated from the water content of all the additives and pigments. Pigments and fillers were then introduced with slow stirring. The mixture was then dispersed without stirring for about 30 minutes at a rotational speed of the dissolver disc of <18 m/s. Under these conditions, the temperature rose rapidly from 65° to 85° C. The removal of water was complete after 20 to 30 minutes. The mixture was cooled and binder component b) was added. The mixture was then left standing, for example overnight, optionally after covering the mixture with a layer of residual solvent. The next day the mixture was thoroughly stirred and optionally adjusted to the application viscosity. The coating composition was then packed and remained stable for prolonged periods in sealed containers.

Corresponding coating compositions in which the auxiliaries and additives were not dried with isocyanate component a) according to the invention, but instead with a commercially available drying agent (tosyl isocyanate) were used for comparison. This drying agent was only used in a quantity corresponding to a molar ratio of tosyl isocyanate to water of 2:1 because the use of larger quantities of this additive not possible due to its high reactivity and the possibility of secondary products being formed.

EXAMPLE 1

This example describes a low-solvent coating composition according to the invention and its use for the formation of a thick paint film on grit-blasted steel plates measuring 190×105×33 mm using an airless spray gun.

For comparison a corresponding coating composition was prepared wherein isocyanate component II (455 parts by weight) was replaced by 120 parts by weight of tosyl isocyanate (molar ratio of isocyanate groups of tosyl isocyanate to water=approx. 2:1, water content determined in advance by analysis).

Composition of the coating composition according to the invention:

|  | Parts by weight |
| --- | --- |
| Additive isocyanate component II | 455 |
| Solvesso 100 (alkyl benzene mixture) a product of Exxon | 2,276 |
| Acronal 700 L (flow control agent, 10% solution) a product of BASF, Ludwigshafen | 20 |
| Bentone 34 (flow aid, 10% paste) a product of Kronos Titan, Leverkusen | 54 |
| Bayferrox 130 BM (iron oxide pigment) a product of Bayer AG, Leverkusen | 116 |
| Micro talc A.T. 1 (filler) a product of Quarzmehlwerk Frechen | 1,230 |
| Lamellar silicate BS 30 (filler) a product of Naintsch Mineralwerke, 8011 Graz, Austria | 1,100 |
| Zinc dust | 2,006 |
| Isocyanate component V | 1,513 |

The quantity of isocyanate component II correspond to a molar ratio of isocyanate group to water of approximately 6:1.

Testing of viscosity stability:
Viscosity during storage in sealed containers:

| after production | 269 mPa · s/23° C. |
| --- | --- |
| after 7 days at approx. 22° C. | 303 mPa · s/23° C. |
| after 14 days at approx. 22° C. | 297 mPa · s/23° C. |
| after 28 days at approx. 22° C. | 309 mPa · s/23° C. |
| after 60 days at approx. 22° C. | 310 mPa · s/23° C. |

The coating comparison was then sprayed in thick layers onto steel plates and was compared with the composition dried with tosyl isocyanate. The coatings were evaluated after drying for 3 days at approx. 20°–25° C./60% relative humidity. The coating composition used for comparison showed no bubbles in a layer thickness of 50 μm, small bubbles in a layer thickness of 80 μm and many small and relatively large bubbles and sagging in a layer thickness of 100 μm. The paint according to the invention showed no sagging up to a layer thickness of 220 μm and was bubble-free in even greater layer thicknesses.

EXAMPLE 2

This example describes a coating composition according to the invention pigmented with an inert pigment which is suitable for the production of primers and its use for the production of a primer. For comparison a corresponding coating composition was prepared wherein isocyanate component I according to the invention (810 parts by weight, corresponding to a molar ratio of isocyanate groups to water of approximately 5.5:1) was replaced by 230 parts by weight of tosyl isocyanate (molar ratio of the isocyanate groups of tosyl isocyanate to water=approx. 2:1; water content determined in advance by analysis of auxiliaries and additives). Steel plates measuring 190×105×3 mm were used as the substrate. The coating compositions were applied with an air gun. Composition of the coating composition according to the invention:

|  | Parts by weight |
| --- | --- |
| Solvesso 100 (alkyl benzene mixture) a product of Exxon | 550 |
| Isocyanate component I | 810 |
| Flow control agent (Acronal 700 L; 10% solution) a product of BASF, Ludwigshafen | 30 |
| Flow aid (Bentone 34; 10% paste) a product of kronos Titan, Leverkusen | 128 |
| Iron oxide pigment (Bayferrox 130 BM) a product of Bayer AG, Leverkusen | 908 |
| Filler magnesium silicate (Micro Talc A.T. 1) a product of Norwegian Talc, Bergen, Norway | 1,312 |
| Filler silica flour (Silbond 600 EST) a product of Ouarzmehlwerk Frechen, Frechen | 1,197 |
| Isocyanate component III | 2,895 |
| Isocyanate component IV | 441 |
| Solvesso 100 solvent | 315 |

| Intrinsic viscosity according to DIN 53 214 (mPa · s at 23° C.) | | |
| --- | --- | --- |
|  | According to the invention | Comparison |
| After storage for 1 day at 23° C. | 280 | 1,090 |
| After storage for 30 days at 23° C. | 300 | 1,930 |
| After storage for 60 days at 23° C. | 350 | 2,890 |

The primers were applied to steel plates and tested after hardening for 3 days at 22° C./60% relative humidity. The degree of creepage at the cut according to DIN 53 167 (salt spray mist test) and the degree of blistering according to DIN 53 209 were tested.

Evaluation after 42 days' testing:

|  | According to the invention | Comparison |
| --- | --- | --- |
| layer thickness (Km) | 95 | 95 |
| Creepage (mm) | none | —* |
| Degree of blistering | none | strong blistering |

*Creepage cannot be measured due to serious blistering.
Result: The coating composition according to the invention had a low viscosity and possessed excellent viscosity stability. The comparison product had a relatively high viscosity which underwent a further considerable increase in storage.

Coatings prepared from the coating composition according to the invention showed excellent resistance in the salt spray mist test. The comparison product failed completely and was totally unsuitable for corrosion-inhibiting primers.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition containing a moisture-hardening binder based on organic polyisocyanates and an additive comprising a member selected from the group consisting of fillers, pigments, solvents, catalysts and flow aids which is prepared by a process which comprises forming a mixture comprising at least those additives which are not completely dry and an isocyanate component a) which has an average NCO functionality of 1.05 to 1.8 and comprises the reaction product of
   a1) a polyisocyanate mixture which comprises, based on the weight of the mixture, 20 to 70% by weight of 2,4'-diisocyanatodiphenylmethane, 20 to 70% by weight of 4,4', and/or 2,2'-diisocyanatodiphenylmethane and 5 to 30% by weight of higher functional polyisocyanates of the diphenylmethane series having an NCO functionality of >2 with a2) a monohydric $C_{1-26}$ alkanol which may contain ether bridges in an amount sufficient to provide to provide a reaction product having an NCO functionality of 1.05 to 1.8, and after the isocyanate/water reaction is substantially complete, further mixing said mixture with an isocyanate component b) which has an isocyanate content of 2.5 to 25% by weight and comprises the reaction product of b1) a polyisocyanate component comprising at least one aromatic polyisocyanate having an NCO content of 10 to 50% by weight with b2) an amount sufficient to provide a reaction product having an isocyanate content of 2.5 to 25% by weight of a polyhydroxyl component comprising at least one polyol having a molecular weight of 500 to about 10,000 and a hydroxyl functionality of 2 to 6 and containing a member selected from the group consisting of ether, ester, thioether and carbonate groups, wherein said polyol may be admixed with up to 40% by weight, based on the total weight of component b2), of at least one alcohol having a molecular weight in the range from 62 to 499 and a hydroxyl functionality of 2 to 6, and any remaining additives, the quantities of components a) and b) corresponding to a weight ratio of a) to b) of 1:1 to 1:30.

2. The coating composition of claim 1 wherein the molar ratio of isocyanate groups of component a) to water present in the additives is 1.5:1 to 30:1.

3. The coating composition of claim 1 wherein the molar ratio of isocyanate groups of component a) to water present in the additives is 2:1 to 15:1.

4. The coating composition of claim 1 wherein said polyol contains ether groups.

5. A process for the production of a coating composition containing a moisture-hardening binder based on organic polyisocyanates and an additive comprising a member selected from the group consisting of fillers, pigments, solvents, catalysts and flow aids which comprises forming a mixture comprising at least those additives which are not completely dry and an isocyanate component a) which has an average NCO functionality of 1.05 to 1.8 and comprises the reaction product of a1) a polyisocyanate mixture which comprises, based on the weight of the mixture, 20 to 70% by weight of 2,4'-diisocyanatodiphenylmethane, 20 to 70% by weight of 4,4'- and/or 2,2'-diisocyanatodiphenylmethane and 5 to 30% by weight of higher functional polyisocyanates of the diphenylmethane series having an NCO functionality of >2 with a2) a monohydric $C_{1-26}$ alkanol which may contain ether bridges in an amount sufficient to provide to provide a reaction product having an NCO functionality of 1.05 to 1.8, and after the isocyanate/water reaction is substantially complete, further mixing said mixture with an isocyanate component b) which has an isocyanate content of 2.5 to 25% by weight and comprises the reaction product of b1) a polyisocyanate component comprising at least one aromatic polyisocyanate having an NCO content of 10 to 50% by weight with b2) an amount sufficient to provide a reaction product having an isocyanate content of 2.5 to 25% by weight of a polyhydroxyl component comprising at least one polyol having a molecular weight of 500 to about 10,000 and a hydroxyl functionality of 2 to 6 and containing a member selected from the group consisting of ether, ester, thioether and carbonate groups, wherein said polyol may be admixed with up to 40% by weight, based on the total weight of component b2), of at least one alcohol having a molecular weight in the range from 62 to 499 and a hydroxyl functionality of 2 to 6, and any remaining additives, the quantities of components a) and b) corresponding to a weight ratio of a) to b) of 1:1 to 1:30.

6. The process of claim 5 wherein the molar ratio of isocyanate groups of component a) to water present in the additives is 1.5:1 to 30:1.

7. The process of claim 5 wherein the molar ratio of isocyanate groups of component a) to water present in the additives is 2:1 to 15:1.

8. The process of claim 5 wherein said polyol contains ether groups.

* * * * *